E. A. M. CARITJ & G. LA FEMINA.
CORK BLOCKING MACHINE.
APPLICATION FILED MAR. 26, 1917.
1,267,311.
Patented May 21, 1918.
6 SHEETS—SHEET 2.
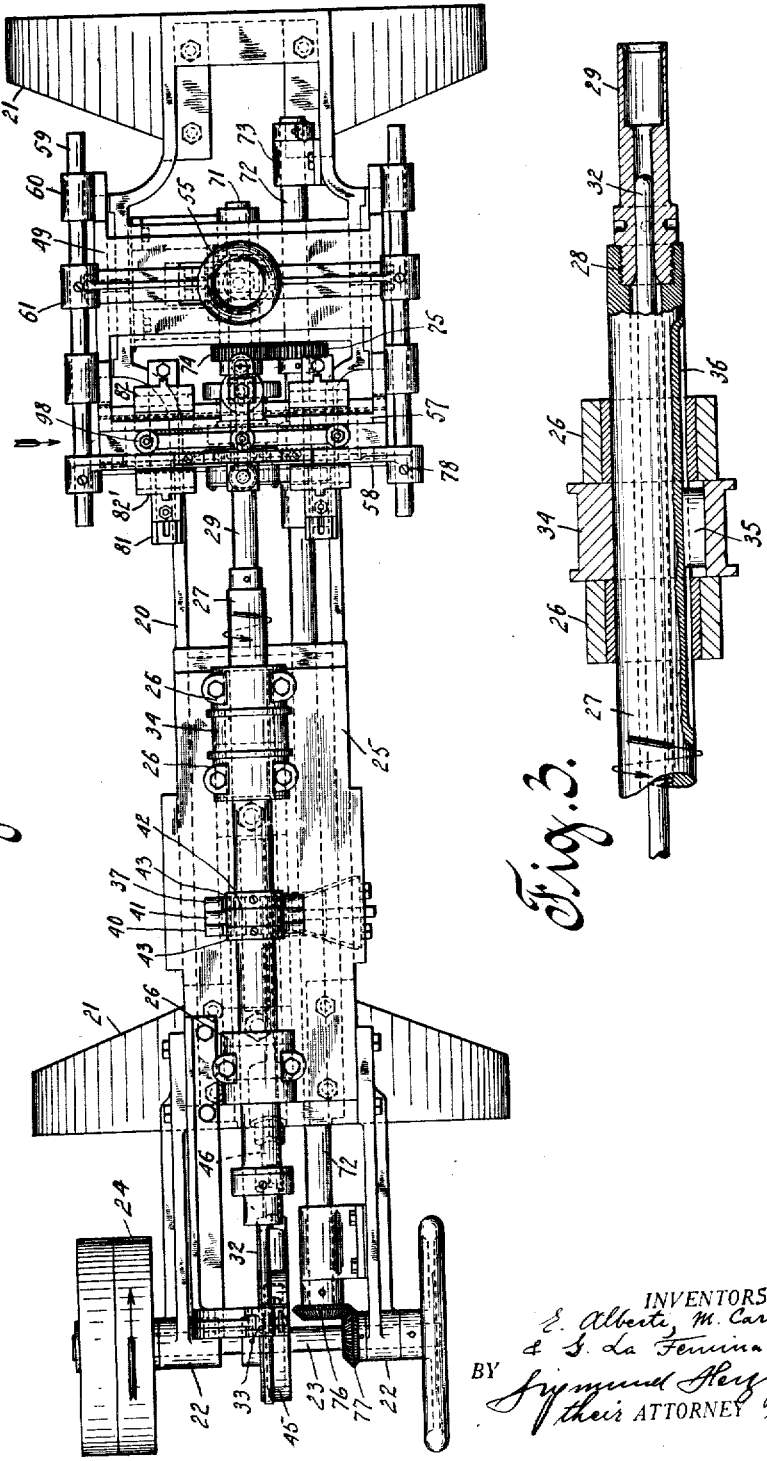
WITNESS
INVENTORS

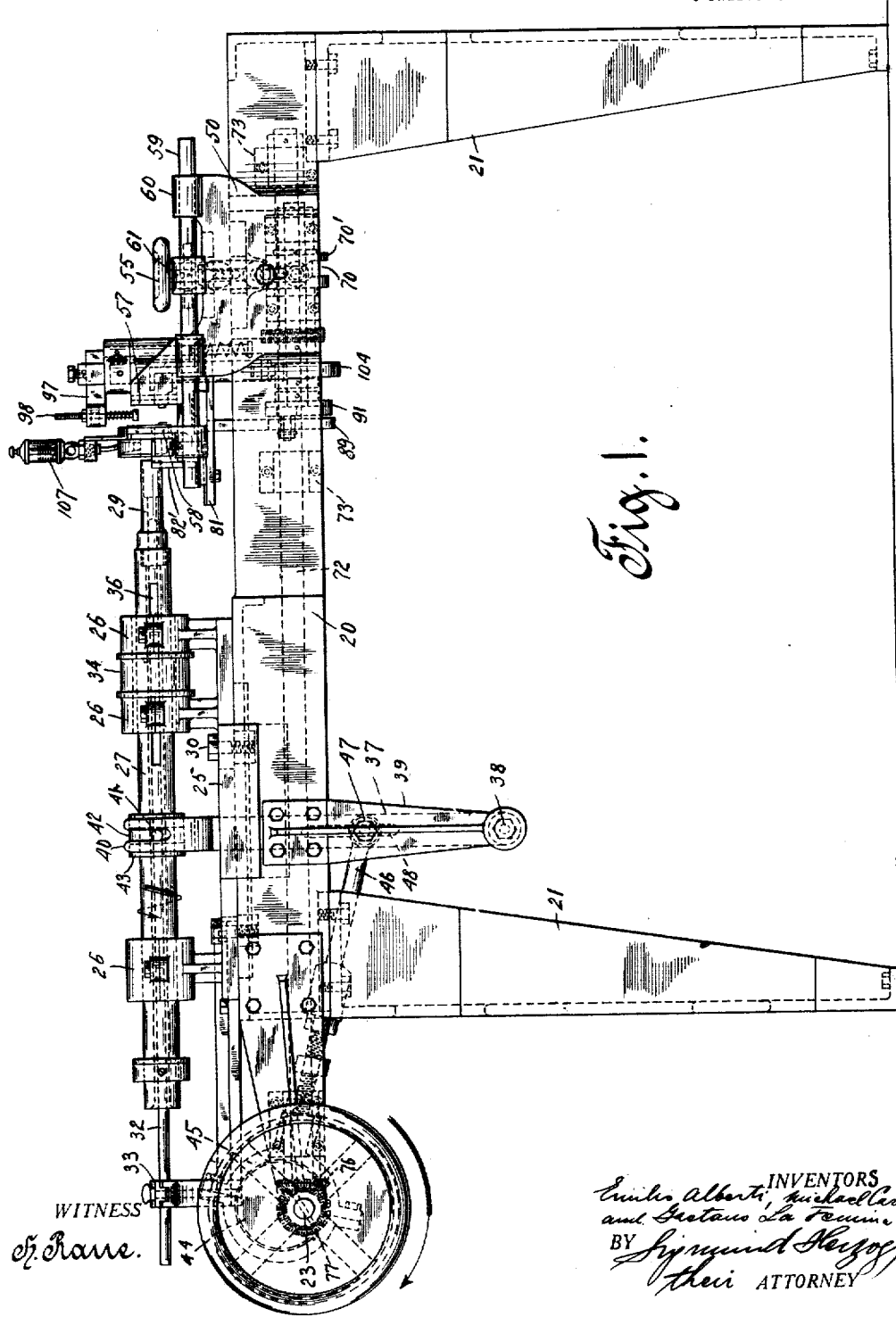

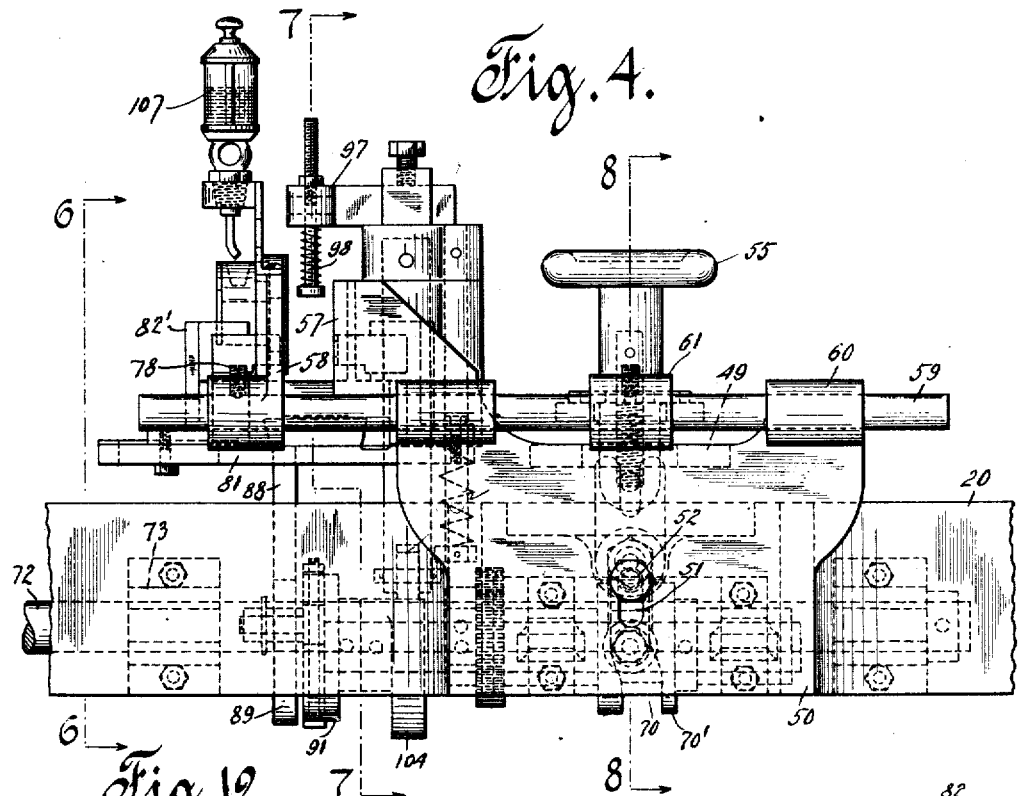
Fig. 4.
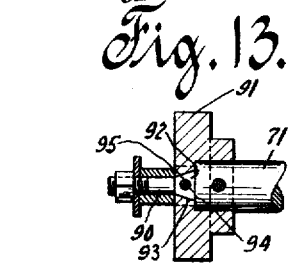
Fig. 12.
Fig. 13.
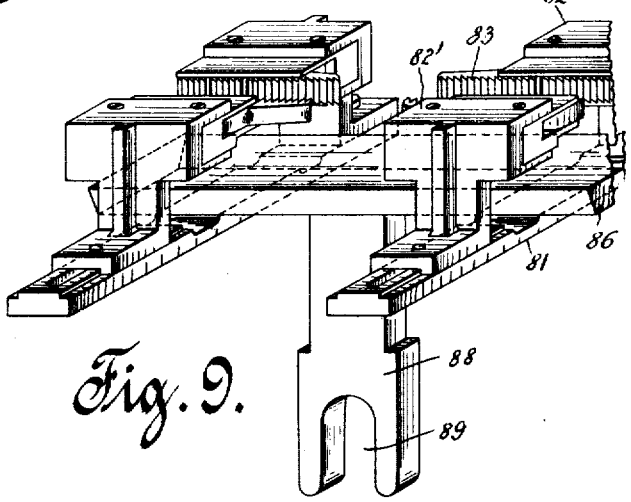
Fig. 9.

E. A. M. CARITJ & G. LA FEMINA.
CORK BLOCKING MACHINE.
APPLICATION FILED MAR. 26, 1917.

1,267,311.

Patented May 21, 1918.
6 SHEETS—SHEET 4.

E. A. M. CARITJ & G. LA FEMINA.
CORK BLOCKING MACHINE.
APPLICATION FILED MAR. 26, 1917.

1,267,311.

Patented May 21, 1918.
6 SHEETS—SHEET 6.

WITNESS

INVENTOR.
BY
ATTORNEY

UNITED STATES PATENT OFFICE.

EMILIO ALBERTI, MICHAEL CARITJ, AND GAETANO LA FEMINA, OF NEW YORK, N. Y., ASSIGNORS TO INTERNATIONAL CORK COMPANY, OF BROOKLYN, NEW YORK, A CORPORATION OF NEW YORK.

CORK-BLOCKING MACHINE.

1,267,311.   Specification of Letters Patent.   Patented May 21, 1918.

Application filed March 26, 1917. Serial No. 157,489.

*To all whom it may concern:*

Be it known that we, EMILIO ALBERTI, MICHAEL CARITJ, citizens of the United States, and GAETANO LA FEMINA, a citizen of the United States of Brazil, and residents of the city of New York, in the county of Kings and State of New York, have invented certain new and useful Improvements in Cork-Blocking Machines, of which the following is a specification.

The present invention relates to an improved apparatus for cutting or blocking out corks from cork strips.

The main object of the invention is to provide an automatic machine for blocking or cutting out bottle corks from cork strips, the said machine feeding the strips to the cutter and holding them in proper position for blocking, and the feeding and holding devices being made adjustable to conform to the size of the strips and the size of the corks desired.

With these and other objects in view, which will more fully appear as the nature of the invention is better understood, the same consists in the combination, arrangement, and construction of parts hereinafter described, pointed out in the appended claims and illustrated in the accompanying drawing, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 5:
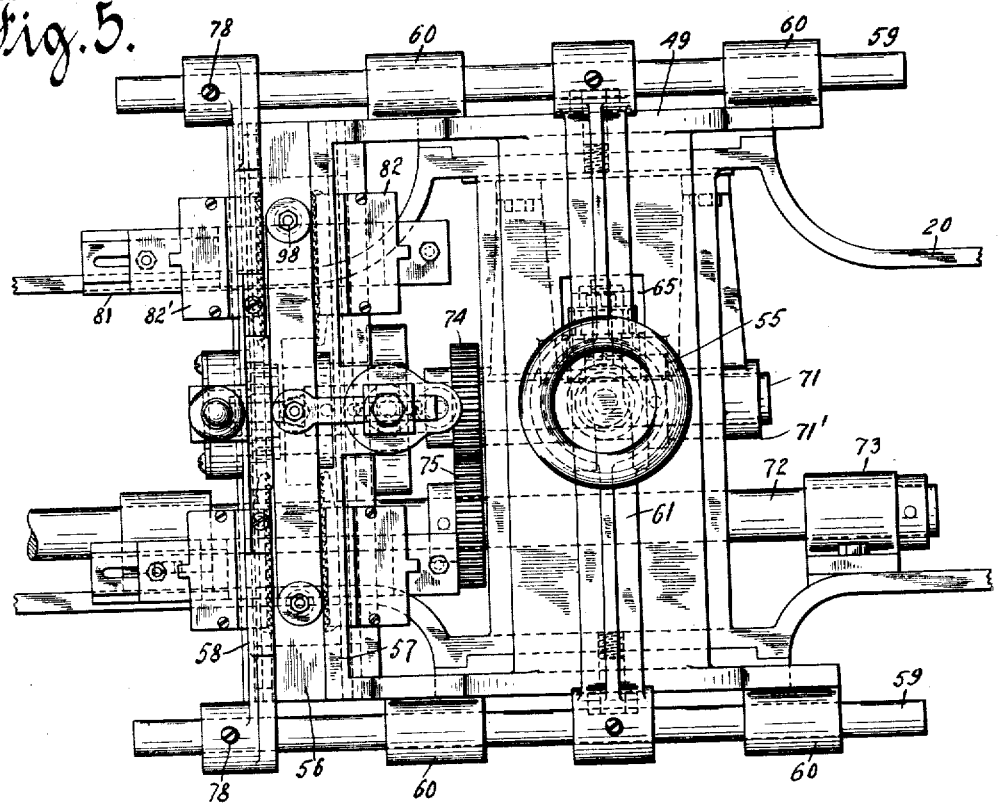
Figure 8:
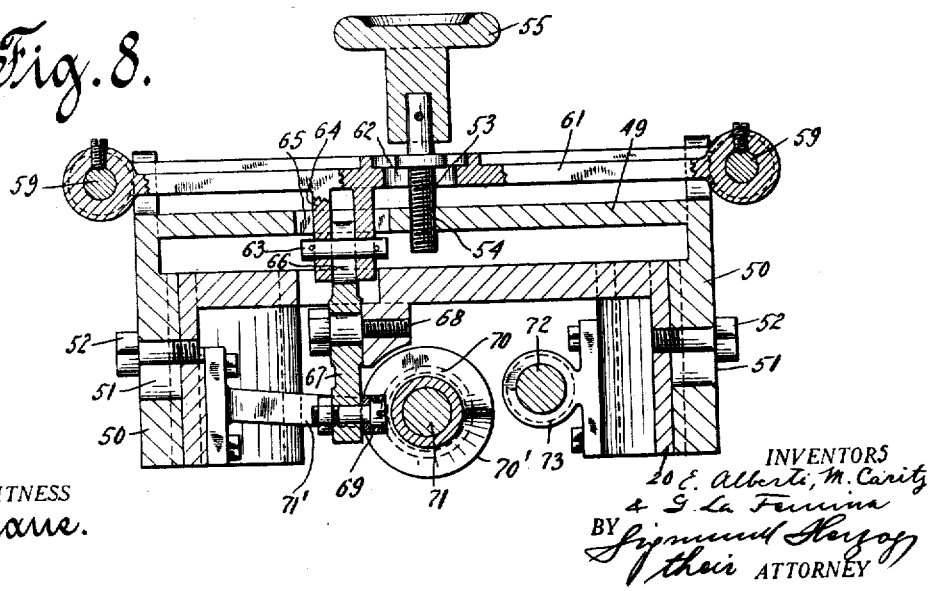
Figure 6:
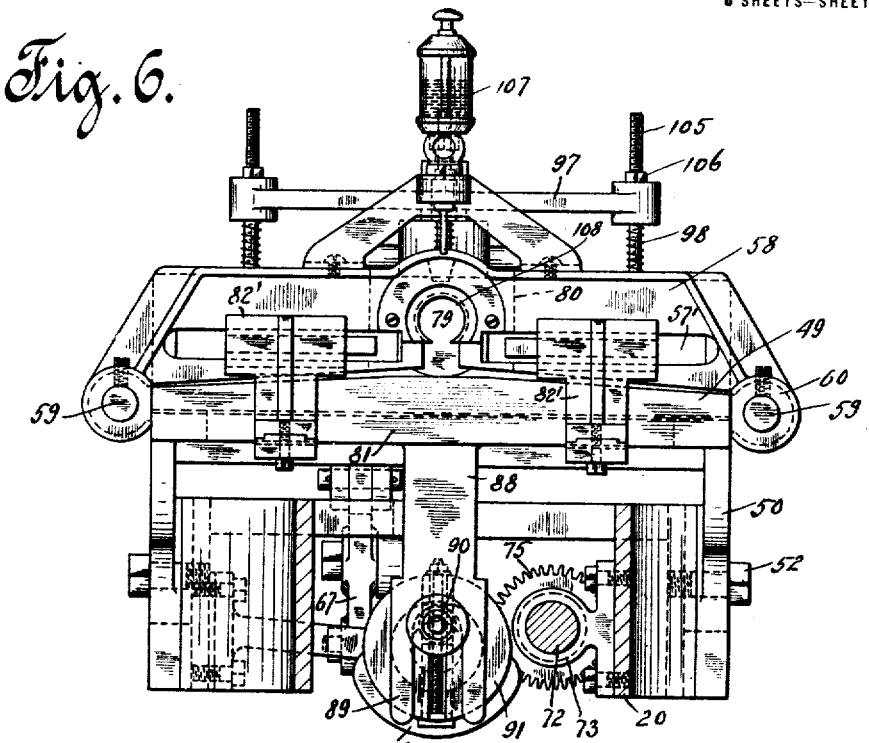
Figure 7:
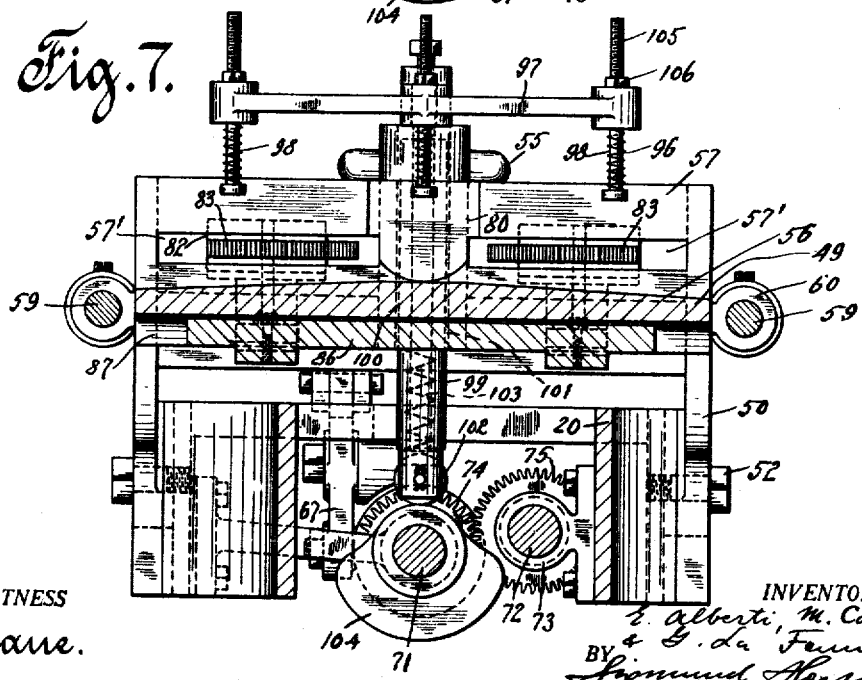
Figure 10:
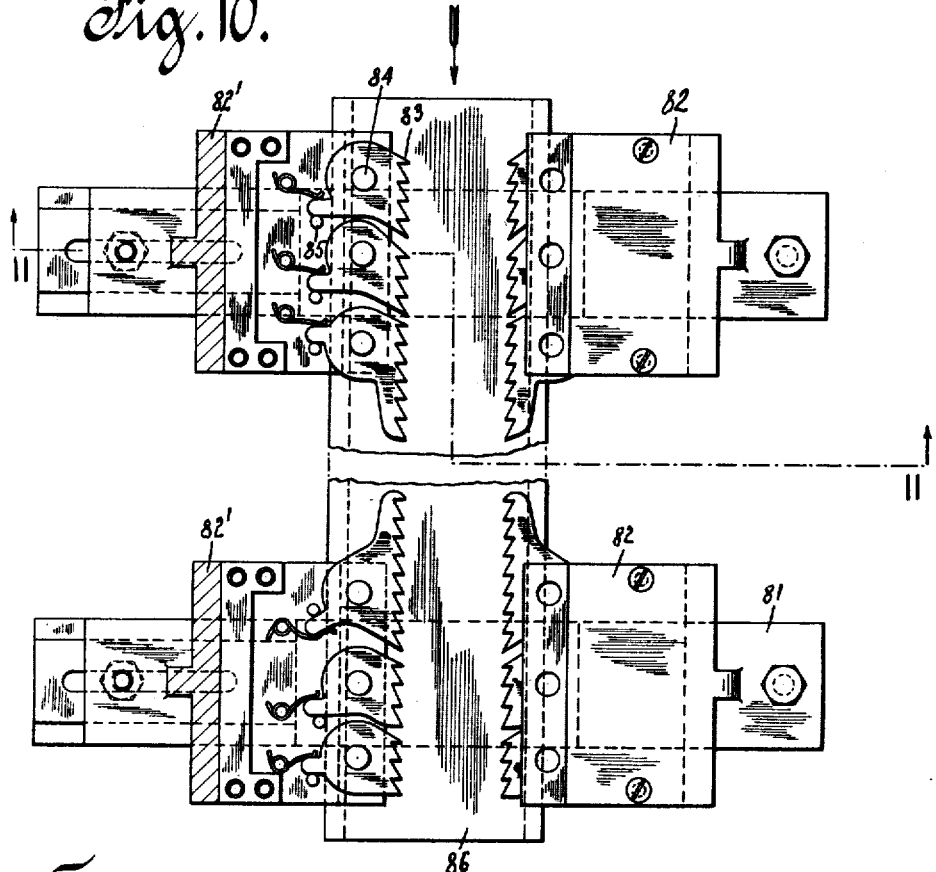
Figure 11:
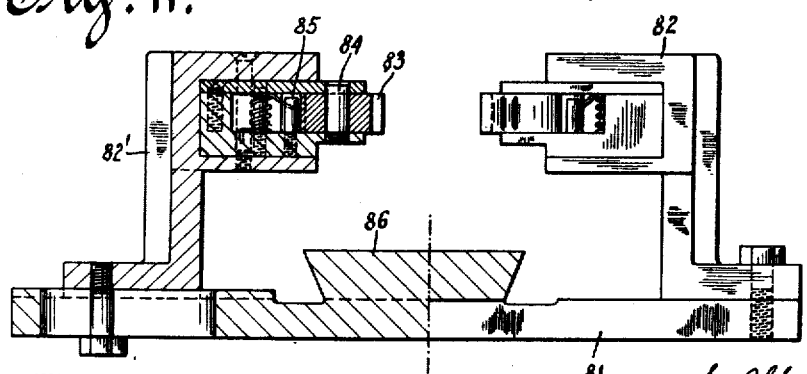

Figure 1 is a front elevation of a cork cutting machine constructed in accordance with the present invention; Fig. 2 is a top plan view thereof; Fig. 3 is a horizontal section taken through the cutter or knife of the machine and one of its bearings; Fig. 4 is a front elevation, on a larger scale, of a portion of the frame and the work support of the machine, and the elements coöperating with said support; Fig. 5 is a top plan view of the device shown in Fig. 4; Fig. 6 is a section taken on line 6—6 of Fig. 4; Fig. 7 is a section taken on line 7—7 of Fig. 4; Fig. 8 is a section taken on line 8—8 of Fig. 4; Fig. 9 is a perspective view of the cork strip feeding mechanism; Fig. 10 is a plan view, partly in section, of the last-named mechanism; Fig. 11 is a section taken on line 11—11 of Fig. 10; Fig. 12 is a front elevation, partly in section, of a crank for actuating the cork strip feeding device; and Fig. 13 is a section taken on line 13—13 of Fig. 12.

In the drawings, the numeral 20 designates the main or supporting frame of the machine, resting on legs 21. The frame carries bearings 22, in which is journaled the driving shaft 23 of the machine. To this shaft rotation may be imparted in any suitable manner, for instance by keying to the same a pulley 24, which is driven by means of a belt, not shown. Upon the table portion of the frame rests a base 25, from which rise bearings 26, in which is rotatably and reciprocably mounted a tubular arbor 27. This arbor is provided in its front end with an interiorly screw-threaded portion 28, into which fits the screw-threaded end of a tubular cork cutter or knife 29. The base 25 is clamped to the main frame, for instance, by screw-bolts 30. For removing the finished product from the cutter, an ejector 32, in the form of a rod, extends through the arbor and partly through the cutter, said ejector being held in position by a bracket 33 upon the main frame. The ejector is held stationary within the arbor and cutter and its position may be adjusted to compensate for the wear at the cutting end of the knife. To properly perform the cutting operation, the cutter is not only reciprocated but also rotated. To rotate the same, there is held between two of the bearings 26 a pulley 34, provided with a key 35 that is seated in a longitudinal slot 36 in the arbor 27. Rotation may be imparted to the pulley in any suitable manner. The cutter reciprocating means includes a lever 37, that is fulcrumed at 38 to a hanger 39 upon the table portion of the frame, and is provided with a fork-shaped upper end 40, in engagement with pins 41 upon a ring 42, the latter being loosely mounted upon the arbor 27 between two stops 43. The lever 37 is oscillated from the main driving shaft 23, to which is, for this purpose, keyed an eccentric 44, to the strap 45 of which is attached, in any suitable manner, an eccentric rod 46, that is connected with the lever 37. The connection between the rod 46 and the said lever is made by a screw-bolt 47, that extends through a longitudinal slot 48 in the said lever. In order to adjust the stroke of the cutter to the thickness of the cork strip, the position of the pivot bolt 47 in the slot 48 of the lever 37 is changed according to the requirements.

The work holder of the machine is mounted upon a horizontal base plate 49, that is disposed above the table portion of the main frame and provided upon the sides of the latter with downwardly extending portions 50, that abut against the sides of the main frame and are provided with vertically extending slots 51, through which extend screws 52, by which the said base plate is fixed in position upon the main frame. The base plate and the parts carried thereby are adapted to be raised or lowered, at will, according to the height of the cork strips. The means for raising or lowering the same comprises a screw bolt 53, the threads of which mesh with those of a hole 54 in the base plate 49. This bolt abuts against the table portion of the main frame, and is provided with a knob 55 for facilitating the rotation of the same. If it is intended to raise the base plate, first the screws 52 are loosened and then the knob turned in the proper direction. When the desired position is obtained, the screws 52 are screwed down. On the base plate is formed a slightly curved feedway 56 for the strips of cork, and on one side of this feedway rises from the base plate a stationary gripping jaw 57, with which coöperates a movable jaw 58, that is disposed upon the other side of the feedway and is adapted to move toward and from said stationary jaw. The movable jaw is attached to two bars 59, which are slidably mounted in bearings 60 on the two sides of the base plate 49. The two bars are connected by a bridge 61, that is located above the base plate and is provided with a slot 62, through which the bolt 53 extends. For moving the movable jaw toward and away from the fixed stationary jaw, there is mounted a pin 63 in lugs 64 upon the underface of the bridge 61, said lugs extending through a slot 65 in the base plate 49. The pin 63 is seated in the fork-shaped end 66 of a lever 67, that is fulcrumed at 68 to the frame 20, and carries an anti-friction roller 69, that extends into the cam groove 70 of a disk 70', the latter being fixed to a countershaft 71, that is journaled in bearings 71', which are attached to the main frame 20. This counter-shaft is geared with a shaft 72, that is journaled in bearings 73 on the main frame, and receives motion from the main driving shaft 23. The connection between the counter-shaft and shaft 72 is made, for instance, by gears 74 and 75, keyed to the counter-shaft and shaft 72, respectively. The shaft 72, on the other hand, is connected with the main driving shaft by bevel-gears 76 and 77, attached, respectively, to the shaft 72 and the main driving shaft. The movable jaw 58 is attached to the bars 59, for instance, by screws 78, which permit the position of the said movable jaw on the said bars to be varied according to the thickness of the cork strips worked upon. In the longitudinal center line of the machine there is formed in the movable jaw a circular aperture 79, in alinement with the cutter 29 and in registering position with a recess 80 in the fixed jaw 57.

The cork strip feeding means comprises a carriage 81, upon which are mounted feeding clamps 82. One set of these clamps is fixedly attached to the carriage, while the other set, denoted by the numeral 82', is adjustable according to the thickness of the cork strips to be fed. Each of the clamps is provided with a plurality of spring pressed toothed pawls 83, which project through slots 57' in the jaws and are adapted to engage with the sides of the cork strips. These pawls are pivoted at 84 to the feeding clamps, their movement around the said pivots being limited by stop pins 85. The carriage is provided with a dove-tailed guide 86, which is seated in a similarly shaped groove 87, the latter being formed in the underface of the base plate 49 and extending transversely of the main frame 20. The feeding clamps are actuated in the following manner: The carriage 81 is provided with a downwardly projecting arm 88, the free end of which is fork-shaped, as clearly shown at 89. Into this fork-shaped end reaches the wrist pin 90 of a crank 91, the latter being rigidly attached to the counter-shaft 71. In order to make the feed adjustable, according to the diameter of the corks to be cut, any suitable means may be provided, for instance, the construction shown in detail in Figs. 12 and 13 of the drawings, from which it appears that the wrist pin 90 is attached to a dove-tailed slide 92, that is disposed in a dove-tailed groove 93 in the crank disk 91. The slide 92 is provided with a screw-threaded hole 94, with which mesh the threads of a screw-bolt 95. By rotating the screw-bolt in one or the other direction, the eccentricity of the wrist pin upon the crank disk is changed, thereby varying the stroke of the feeding clamps.

With the feeding mechanism of the machine is associated a plurality of presser-feet 96. These presser-feet are carried by a frame 97, and comprise each a spring-pressed spindle 98. The frame 97 is mounted upon a bar 99, that extends through registering holes 100 and 101 in the base plate 49 and the table portion of the frame 20, respectively. This bar carries on its lower free end an anti-friction roller 102, that is held by a spring 103 in engagement with a cam 104, the latter being mounted upon the counter-shaft 71. The spindles 98 of the presser-feet extend through the frame 97 and are provided at their upper portions with screw-threads 105, in mesh with those of nuts 106, the latter bearing against the upper face of the frame 97, and thereby acting as stops. They serve also to adjust the distance to which the said spindles project below the underface of the frame 97, as the height of the cork strips worked upon varies. The presser-feet are resilient to adapt them to the irregularities of the upper faces of the cork strips.

The manner in which the eccentric 44, the cam disk 70', the crank 91 and the cam 104 are timed will appear from the description of the operation of the device hereinafter given.

The general operation of the machine is as follows: The parts are first properly adjusted to the condition and length of the cutter, the size of the strip, and the diameter of the corks to be cut. Accordingly, first a cutter of the proper size is fixed upon the arbor 27, which is to be given a stroke depending upon the thickness of the cork strip, or in other words the length of the cork. The base plate 49, with the parts carried thereby, is then raised or lowered to bring the cork strip in proper relation to the cutter. After this the movable jaw 58 is fixed in the desired position upon the bars 59, and the feeding clamps 82' shifted into and fixed in place upon the carriage 81 so that the pawls of all clamps engage the strip. The wrist pin 90 is then adjusted upon the crank disk, to cause a proper stroke of the feeding clamps. The main shaft and the cutter arbor are then put in rotation, and the cork strips are, one after the other, placed upon the work support between the stationary and movable jaws and advanced manually, until they are within the reach of the feeding clamps. Before the rotary cutter, in its forward stroke, reaches the movable jaw 58, the latter presses the cork strip firmly against the stationary jaw 57, and the presser-feet are held against the upper face of the strip, thereby holding the same down on the feedway 56. The cutter, in completing its forward stroke, blocks out a cork from the strip, the said cork remaining within the cutter, to be removed therefrom by the ejector 32, when the cutter moves in the opposite direction. The finished product falls into a chute, to slide into a receptacle below the same, (the chute and receptacle are not shown). The eccentric 44, cam 104, and cam disk 70' are timed in such a manner, as appears from the foregoing, that during the cutting operation the gripping jaws and the presser-feet hold the cork strips against motion. While the cutting operation takes place, that is to say, during the time the gripping jaws and presser-feet hold the cork strip against movement, the feeding clamps are moved by the crank 91 on their idle stroke. After the cutting operation has been performed, the movable gripping jaw recedes from the stationary one and the presser-feet are lifted. The crank 91 causes then the feeding clamps to move the cork strip a predetermined distance toward the cutter. The gripping jaws and the presser-feet engage then again the work. The cycle of operation now described is then repeated.

For lubricating the cutting end of the tubular knife, there is mounted upon the movable jaw 58 an oil cup 107, from which the lubricating material is discharged onto a felt piece 108, that is in contact with the cutter.

What we claim is:

1. In a machine for blocking corks from strips, a work support having a feedway provided upon one of its sides with a fixed gripping jaw and with a movable gripping jaw upon its other side, means for positively operating said movable jaw for bringing it into both its gripping and releasing positions, and feeding clamps having spring-pressed toothed pawls extending through said gripping jaws, said pawls being in engagement with the two sides of the cork strip on both the idle and feeding strokes of said clamps.

2. In a machine for blocking corks from strips, a work support having a feedway provided upon its sides with gripping jaws, and feeding clamps having spring-pressed toothed pawls extending through said gripping jaws, said pawls being in engagement with the two sides of the cork strip on both the idle and feeding strokes of said clamps.

3. In a machine for blocking corks from strips, a work support having a feedway provided upon its sides with gripping jaws, and feeding clamps having spring-pressed pawls extending through said gripping jaws, said pawls being in engagement with the two sides of the cork strip on both the idle and feeding strokes of said clamps.

4. In a machine for blocking corks from strips, the combination with a main frame, of a cutter arranged thereon, a work support having a feedway provided upon its sides with gripping jaws, feeding clamps reciprocably disposed upon said work support and provided with spring-pressed pawls extending through said gripping jaws, said pawls being in engagement with the two sides of the cork strip on both the idle and feeding strokes of said clamps, and means for raising or lowering said work support and the parts carried thereby in relation to the longitudinal axis of said cutter.

5. In a machine for blocking corks from strips, the combination with a main frame, of a work support thereon having a feedway provided upon one of its sides with a fixed gripping jaw and with a movable gripping jaw upon its other side, bars slidably disposed upon said work support to which said movable jaw is secured, a rotary shaft, and coacting means upon said shaft and said bars for positively operating said movable jaw to bring it into both its gripping and releasing positions.

6. In a machine for blocking corks from strips, the combination with a main frame, of a work support thereon having a feedway provided upon one of its sides with a fixed gripping jaw and with a movable gripping jaw upon its other side, bars slidably disposed upon said work support to which said movable jaw is secured, a rotary shaft, coacting means upon said shaft and said bars for positively operating said movable jaw to bring it into both its gripping and releasing positions, and means for independently adjusting said movable jaw toward or from the other jaw in conformity to the thickness of the cork strip.

7. In a machine for blocking corks from strips, the combination with a main frame, of a work support thereon having a feedway provided upon one of its sides with a fixed gripping jaw and with a movable gripping jaw upon its other side, bars slidably disposed upon said work support to which said movable jaw is secured, a rotary shaft, coacting means upon said shaft and said bars for positively operating said movable jaw to bring it into both its gripping and releasing positions, a rotary cutter upon said main frame, and means for raising said work support and the parts carried thereby in relation to the longitudinal axis of said cutter.

8. Feeding means for a machine for blocking corks from strips, comprising a carriage having two rows of juxta-posed feeding clamps fixedly attached thereto, each of which is provided with spring-pressed pawls adapted to engage the two sides of the cork strip, the clamps of one row being adjustable toward and away from the other row in conformity to the thickness of the cork strip.

9. In a machine for blocking corks from strips, a work support having a feedway provided with gripping jaws, and feeding clamps having spring-pressed pawls coacting with said gripping jaws and being in engagement with two sides of the cork strip on both the idle and feeding strokes of said clamps.

10. Feeding means for a machine for blocking corks from strips, comprising juxtaposed feeding clamps each of which is provided with spring-pressed pawls adapted to engage two sides of the cork strip.

11. Feeding means for a machine for blocking corks from strips, comprising juxta-posed feeding clamps each of which is provided with spring-pressed pawls adapted to engage two sides of the cork strip, said pawls being in engagement with the cork strip on both the idle and feeding strokes of said clamps.

Signed at New York, in the county of Kings, and State of New York, this 10th day of February, A. D. 1917.

EMILIO ALBERTI.
MICHAEL CARITJ.
GAETANO LA FEMINA.

It is hereby certified that in Letters Patent No. 1,267,311, granted May 21, 1918, upon the application of Emilio Alberti, Michael Caritj, and Gaetano La Femina, of New York, N. Y., for "Cork-Blocking Machines," an error appears requiring correction as follows: In the drawings, Sheets 1-6, headings, names of patentees, for "E. A. M. Caritj & G. La Femina" read *E. Alberti, M. Caritj, & G. La Femina;* and that the said Letters Patent should be read with this correction therein that the same may conform to the record of the case in the Patent Office.

Signed and sealed this 25th day of June, A. D., 1918.

[SEAL.]

R. F. WHITEHEAD,
*Acting Commissioner of Patents.*

Cl. 144—23.